United States Patent [19]

Pugsley

[11] 3,875,587

[45] Apr. 1, 1975

[54] COLOUR SCANNERS FOR IMAGE REPRODUCTION

[75] Inventor: Peter C. Pugsley, Pinner, England

[73] Assignee: Crosfield Electronics Limited, London, England

[22] Filed: May 18, 1973

[21] Appl. No.: 361,804

[30] Foreign Application Priority Data

May 19, 1972 United Kingdom .............. 23751/72

[52] U.S. Cl. .......................... 358/80, 178/7.6, 350/7

[51] Int. Cl. .......................... H04n 1/22, H04n 1/46

[58] Field of Search ............... 178/5.2 A, 5.2 R, 7.6, 178/14; 350/286, 6, 7

[56] References Cited

UNITED STATES PATENTS

| | | | |
|---|---|---|---|
| 3,230,303 | 1/1966 | Macovski et al. | 178/5.2 R |
| 3,475,553 | 10/1969 | Reese et al. | 178/7.6 |
| 3,622,690 | 11/1971 | Stephens et al. | 178/5.2 R |
| 3,651,256 | 3/1972 | Sherman et al. | 178/7.6 |
| 3,651,256 | 3/1972 | Sherman et al. | 178/7.6 |
| 3,670,099 | 6/1972 | Oliver | 178/6 |
| 3,765,743 | 10/1973 | Reaves et al. | 350/7 |

OTHER PUBLICATIONS

Goldsmith (Editor), Alfred; "Radio Facsimile," 10-1938, RCA Institutes Technical Press, N.Y., N.Y., p. 151-152.

Thaler, George; "Servomechanism Analysis," 1953, McGraw-Hill, New York, p. 345.

*Primary Examiner*—Robert L. Griffin
*Assistant Examiner*—Mitchell Saffian
*Attorney, Agent, or Firm*—Kemon, Palmer & Estabrook

[57] ABSTRACT

In a method and apparatus of image reproduction in which a light-sensitive surface is scanned by a light beam modulated by a reproducing head in accordance with a signal representing the densities of successive image elements to be reproduced, a component of the scanning motion is obtained by mounting the light-sensitive surface on the non-rotating surface of a cylinder and rotating a portion of the reproducing head within the cylinder so as to define a circular track on the output surface during one revolution of the rotatable portion of the reproducing head. A rotatable prism having a plurality of internal reflecting surfaces, such as a pentaprism, may reflect the light beam and may move axially within the cylinder to provide the other component of scanning motion. The pentaprism is advantageous during the presence of rotational vibration. Additionally, a plurality of light-sensitive surfaces may be placed sequentially on the surface of the cylinder to form respective color separations.

10 Claims, 6 Drawing Figures

COLOUR SCANNERS FOR IMAGE REPRODUCTION

In one technique for reproducing an original picture, the original to be reproduced is wrapped around a cylinder and is scanned, point by point, by a photo-electric device, the output of the photo-electric device representing the density of successively scanned points. In the case of a colour scanner, the colour content of the coloured original is analysed, point by point, by photoelectric devices and colour filters, so that for each colour separation to be reproduced, a colour component electric signal is derived, this signal being used to control the exposure of a film which is to form a colour separation for that colour component. The film on which the reproduction or colour separation is to be made is wrapped around an output cylinder which rotates at the same speed as the input cylinder and which may be an axial extension of the input cylinder. This film is exposed point by point to light modulated in accordance with the signal derived from the original, the point by point analysis of the original and exposure of the output film being effected by rotating the cylinder or cylinders and simultaneously causing slow relative axial movement between the cylinders and the analysing and exposing heads.

The present invention is concerned with a method of reproducing an image on an output surface in which by relative movement of the output surface and a reproducing head the head is caused to scan the output surface in a succession of parallel lines constituting a scanning raster, the reproducing head being adapted to treat the output surface to form an image thereon under the control of an electric signal obtained by scanning an original to be reproduced and representing the density, or a colour-component density, of sucessively scanned points of the original; according to the invention, relative movement of the output surface and the reproducing head in one direction of the scanning raster is achieved by mounting the output surface on a cylindrical surface of a stationary cylinder, mounting axially within the cylinder a rotatable portion of the reproducing head, adapted to scan the output surface, and rotating the said rotatable portion within the cylinder, whereby during one revolution of such rotation a line of the said output surface is progressively treated under the control of the said electric signal. The image formed by the reproducing head may of course be a latent image formed on a photographic film. It will be appreciated that the electric signal may have undergone various modifications, such as tone correction or colour correction, for example, before application to the reproducing head. Preferably, relative movement of the output surface and reproducing head in the other of the said mutually transverse directions is also obtained by axial movement of the said portion of the reproducing head within the cylinder.

In one form of apparatus embodying the invention, for use in the reproduction of coloured images, more than one output surface, to form a colour separation of the original, is mounted on a single cylindrical track of the cylinder. The signals which are applied to the reproducing head then represent successively one line of each of the said colour separations. In this way, high productivity is achieved without lengthening the machine in the way that would be required if the four separations were made simultaneously on four output cylinders spaced along a common shaft, as in some known scanners.

In apparatus embodying the invention, the output cylinder may be transparent, so that a film to be exposed can be wrapped around its external surface with the sensitive side innermost. Alternatively, the cylinder may have provision for fixing a film or other output surface to its internal cylindrical surface.

In our preferred arrangement, an exposing beam enters the output drum axially and is reflected through 90° by a pentaprism. The use of a pentaprism or equivalent device for turning the beam through a right-angle is advantageous in that small angular errors of the pentaprism arrising from vibration during rotation do not produce an angular movement of the output beam in a plane containing the axis of rotation. Angular vibration would be produced as angular movement of the beam in this plane if a mirror or a prism with a single reflecting surface were used to reflect the beam.

In order that the invention may be better understood, a method and apparatus embodying the invention will now be described with reference to the accompanying drawings, in which.

Figure 1:
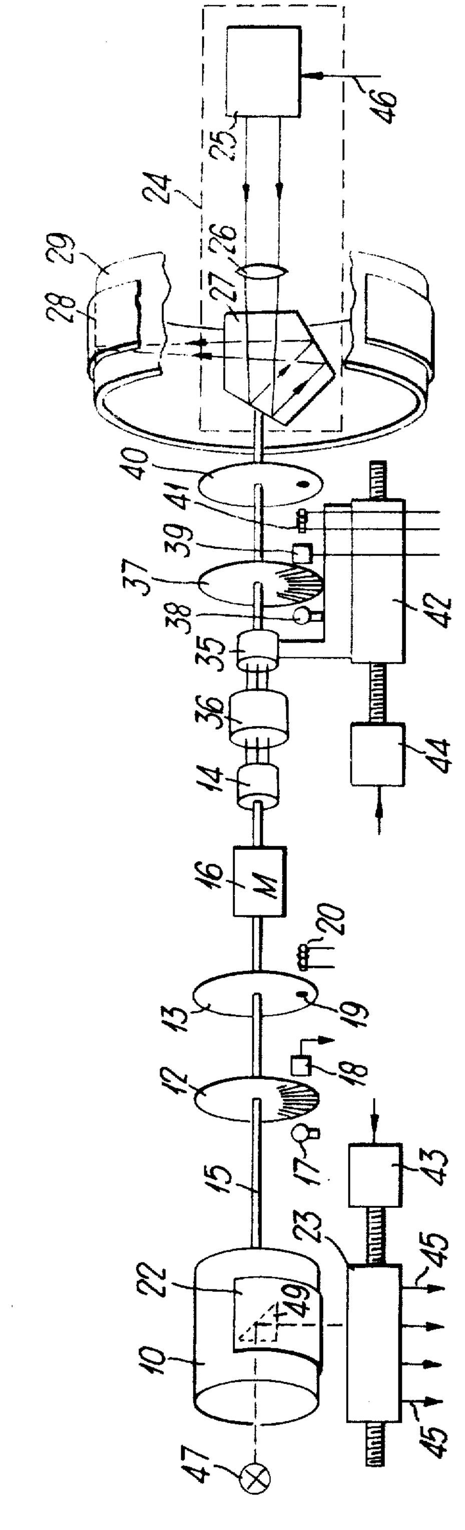
FIG. 1 shows the general arrangement of the scanning portions of the machine.

In FIG. 1, an input cylinder 10, a disc 12 formed as a radial grating, a disc 13 and a synchro-torque transmitter 14 are mounted on a common shaft 15 driven by a motor 16. The radial grating 12 co-operates with a light source 17 and a photo-cell 18 which provides, during rotation of the shaft 15, a succession of pulses. The disc 13 is of non-magnetic material but carries a magnetic insert 19 which causes a signal to be generated in an electro-magnetic pick-up coil 20 once in each revolution of the disc.

Figure 2:
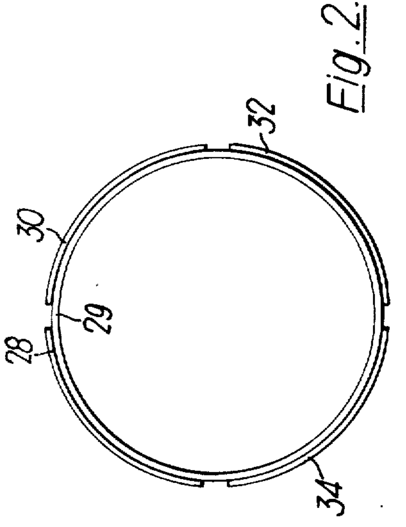
FIG. 2 shows the manner in which films, to form colour separations, are disposed around the output cylinder of the machine.

The input cylinder 10 carries an original 22 which is scanned by an input scanning head 23, the latter containing photo-electric devices and colour filters such that it provides three colour component signals representing the colour components of successively scanned elements of the coloured original. Corrected colour component signals are used in an exposing head 24, consisting of a laser and modulating unit 25, a lens 26 and a rotatable pentaprism 27, to cause a film 28 to be exposed. The film 28 is mounted on the outer surface of a transparent output cylinder 29, the film being arranged with its sensitive side innermost. In this example, the film 28 is one of four films mounted around the said output surface, these being the film 28 which is designed to form a yellow separation, a magenta separation film 30, a cyan separation film 32 and a black separation film 34 (see FIG. 2).

The rotatable pentaprism 27 is coupled to the synchro-torque transmitter 14 by means of a synchro-torque receiver 35 and a differential synchro 36. The differential synchro 36 includes a control to enable adjustment of the vertical picture position on the output separations; this is useful if successive pictures are exposed on different portions of the same separation films, for example to perform page make-up operations. It would of course alternatively be possible to couple the motor 16 to the shaft rotating the pentaprism 27 by means of a positive belt drive.

Also driven by the synchro-torque receiver 35 are a radial grating 37 and a disc 40. The radial grating 37 co-operates with a light source 38 and a photo-cell 39 and the disc 40 includes a magnetic insert which causes a signal to be generated in an electro-magnetic pick-up 41 once in each revolution of the disc. The assembly comprising the synchro-torque receiver 35 and the elements 37 to 41 are mounted on a non-rotatable nut 42 which is in turn mounted on a lead screw which is rotated by a driving unit 44. As a consequence of this rotation, the nut 42 moves longitudinally, causing the elements 35 and 37 to 41, together with the pentaprism 27, to move axially relative to the stationary cylinder 29. In a similar manner, the analysing head 23 is mounted on a lead screw rotated by a driving unit 43, rotation of this lead screw causing longitudinal movement of the analysing head parallel to the axis of the cylinder 10.

This combination of cylindrical movement and axial movement causes a scanning of the input and output surfaces. At the input cylinder, light from a source 47 is reflected by a prism 49 through the original 22, the light modulated by the original being received by photo-electric devices in the analysing head 23. These devices generate three colour-component signals representing the densities of the three colour components of successively scanned elements of the original. The head 23 also generates an "unsharp" signal, obtained by scanning the original with an aperture larger than that used for the colour component signals. This unsharp signal is subsequently combined with one or more of the colour component signals in known manner, to enhance edge contrast in the reproduction. The signals generated by the analysing head 23 are applied to lines 45. At the reproducing head, at any instant a corrected colour component signal is received on line 46 and is applied to the modulator within the unit 25.

Figure 3:
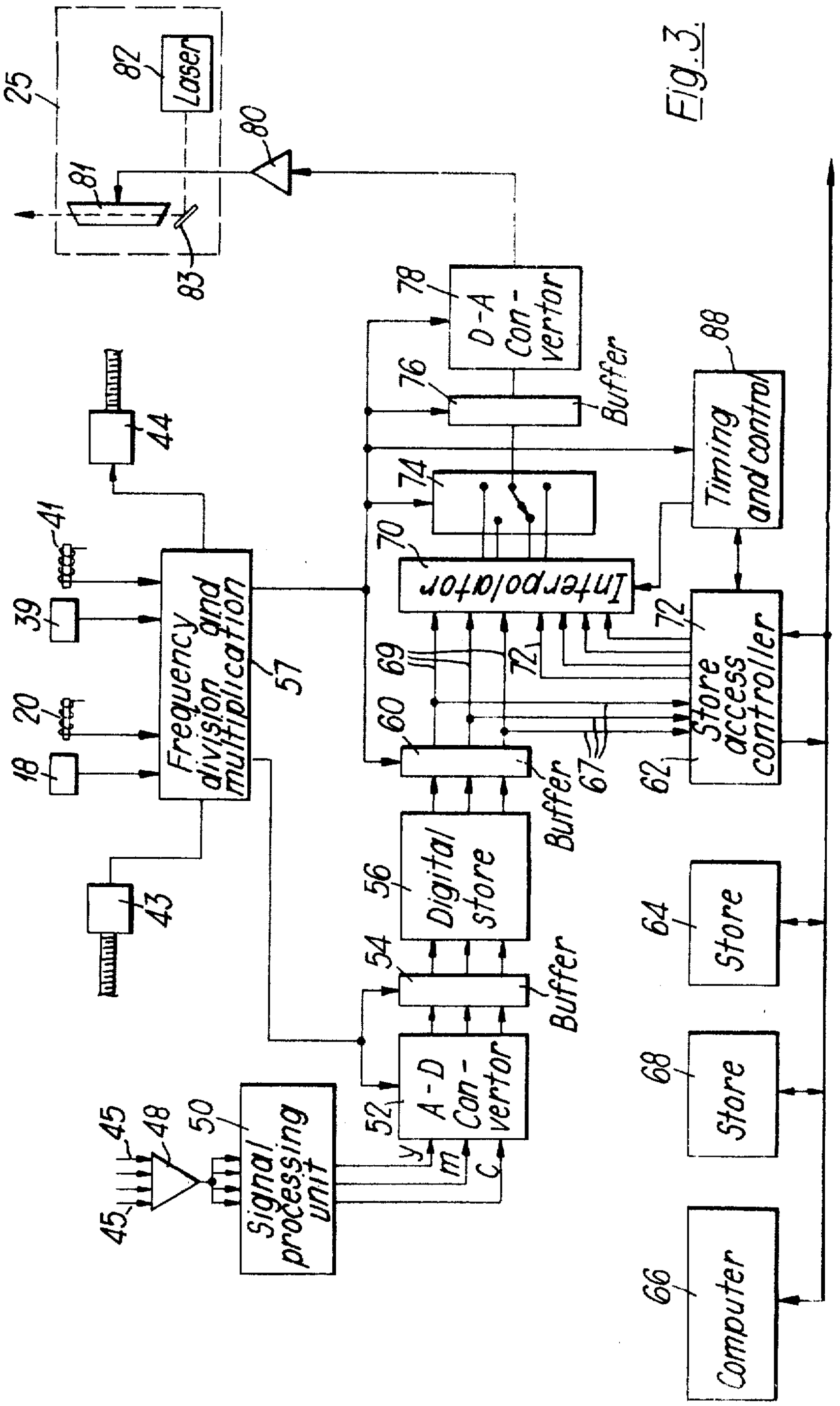
FIG. 3 shows in the form of a block diagram the circuits between an analysing head and the reproducing head.

Turning now to FIG. 3, the signals on lines 45 are applied through amplifiers 48 to a signal processing unit 50, in which the unsharp signal is combined with each of the sharp signals in known manner to accentuate the contrast at edges of objects in the picture. The circuit 50 may also include means for carrying out other forms of analogue processing of the signals but it does not carry out any colour correction of the colour component signals.

The yellow-channel, magenta-channel and cyan-channel signals are then converted to digital form in an analogue-digital converter 52 and are transferred through a buffer circuit 54 to a digital store 56. A frequency division and multiplication unit 57 receives signals from the photo-cells 18 and 39 and the electromagnetic picups 20 and 41 of FIG. 1. This unit 57 controls the rate of insertion of data into the store 56 and this rate, relative to the rate of rotation of the cylinder 29 and of axial movement of the cylinder with respect to the exposing head 24 controls the degree of enlargement or reduction of the reproduced image relative to the original. The rate of insertion of data into the store is controlled by a signal derived from sensors 18 and 20 while the rate of sending is controlled by a signal derived from sensors 39 and 41. The manner in which this is achieved is more fully described in our U.S. Pat. No. 3,541,245. The unit 57 also controls the operation of the lead screw driving units 43 and 44.

In the apparatus which is being described, colour correction is carried out with the aid of a store 64 which stores signal values corresponding to the desired renderings of a large number of colour points, appropriate colour points being extracted as required during scanning. This method is more fully described in our co-pending U.S. Pat. Application Ser. No. 321,118 now abandoned. For the preliminary loading of the store 64, parameter values chosen in accordance with the requirements of an image to be scanned are set into a smaller store 68 and a computer 66 is employed to obtain a matrix of output values corresponding to given input values, using the selected parameter values; corresponding output and input values for the matrix are then stored in the digital store 64, the input values being used as store addresses and the output values as data. When scanning commences, the store 64 is addressed by the yellow, magenta, and cyan signals from the enlarging digital store 56, through a buffer circuit 60 and a store access controller 62.

The signals which are sent over lines 67 to address the store 64 are "coarse" signals, the least significant bits, representing the "fine" quantising levels, having been transferred over lines 69 to an interpolator 70. The colour-corrected signals obtained from the store 64 are routed through the controller 62 and over lines 72 to the interpolator 70. However, in this example the store 64 provides four output signals for each set of three input signals, defining a colour point, the fourth output signal being a black printer.

An interpolator is necessary when, as will usually be the case, the number of possible different picture elements exceeds the number of addresses which it is reasonable to provide in the store. For example, in high quality work each photo-multiplier signal may be coded into seven digits of pure binary code. This would require a total of $2^{21}$ addresses, i.e., about 2 million. This can be reduced to 4096 addresses by linear interpolation in three dimensions. A method of interpolation is more fully described in our co-pending application Ser. No. 321,118 now abandoned. Thus the coarse values on lines 72 are selectively multiplied by means of multiplying factors derived from the fine signals on lines 69 and the resulting products are summed to obtain the cyan, yellow, magenta and black output signals. A selector switching unit 74 is interposed between the interpolator and a buffer 76. The switching unit 74 includes an electronic switching circuit operating in synchronism with the rotation of the cylinder 29, the switching unit selecting each of the four colour component output terminals once in each revolution of the drum. The signal from the buffer circuit passes through a digital-analogue converter 78 and the resulting analogue signal is applied through a driver amplifier 80 to a modulator 81 which receives light from a laser 82 by way of a reflector 83. The modulated light passes through the lens 26 to the pentaprism 27, as described in connection with FIG. 1. It will be seen that one line of each of the four separations is exposed in each revolution of cylinder 29, scanning continuing until the whole of each separation image area has been exposed.

The operation of the various circuits is synchronised by a timing and control unit 88 which is in turn controlled by the frequency division and multiplication circuits in the control unit 57.

Figure 4:
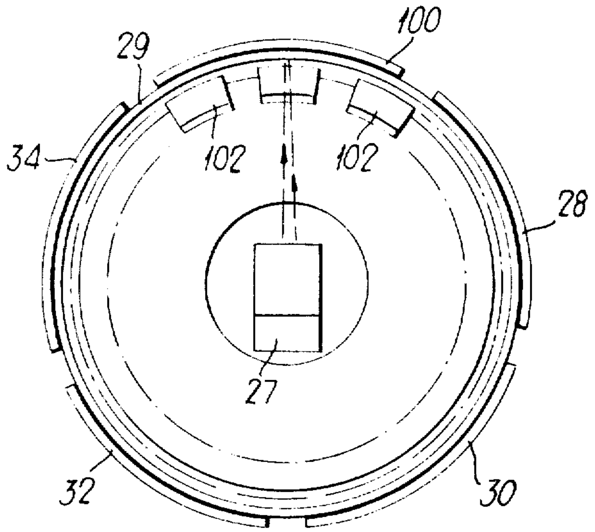
FIGS. 4 and 5 are an end view and a sectional side view of a modification of the output scanner shown in FIG. 3, for use when a mask is used in a reproduction process.
Figure 5:
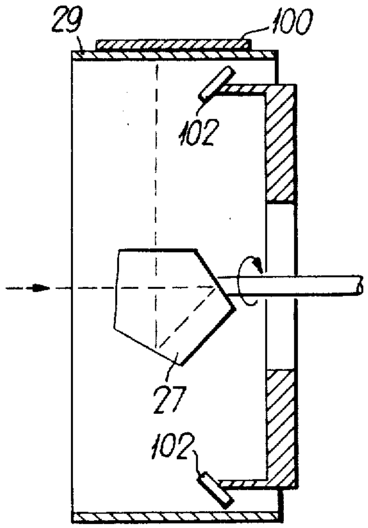
Figure 6:
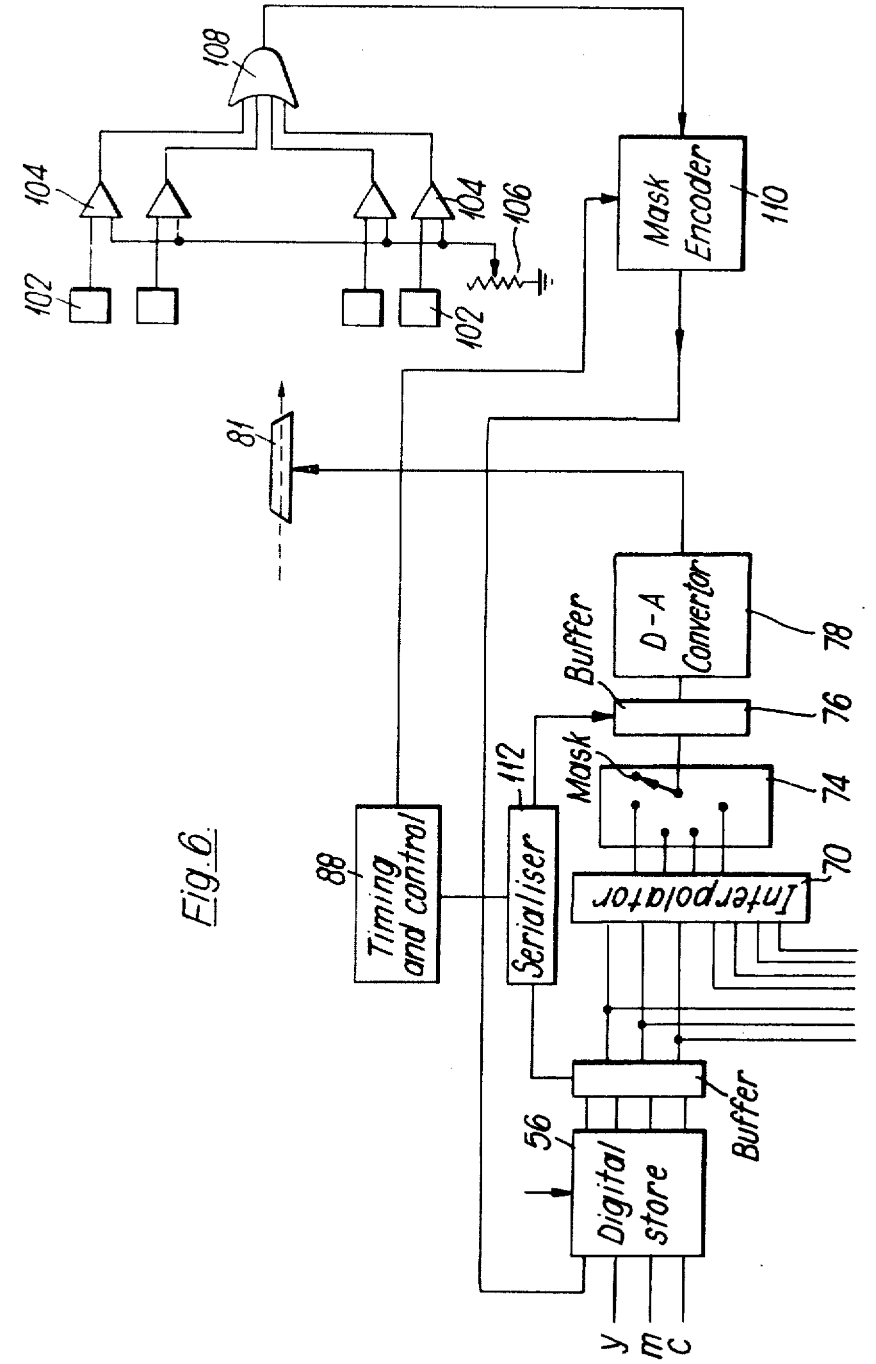
FIG. 6 shows a modification of the circuit of FIG. 3 which can be used with the output scanner of FIGS. 4 and 5.

It may in some cases be desirable to control the exposure of a reproduction or colour separation by means of a mask. Such a mask defines an outline within which, or outside which, the computed picture signal level is replaced by an arbitrary level. The mask may be placed on a separate cylinder and scanned by a separate analysing head. Alternatively, as shown in FIGS. 4 and 5, it can be arranged to occupy the same track of the output cylinder on which are laid the films which are to be exposed to form colour separations. Thus if a black printer is required, each film will occupy one-fifth of the circumference and the remaining one-fifth will be occupied by the mask 100. The laser beam is then used alternately to expose the separation films and to illuminate the mask, light from the mask falling on one or more of a non-rotatable ring of stationary photoelectric devices 102 mounted on and traversing with the nut 42 (see FIG. 1). Each photo-electric device 102 has its output connected to the input of a respective threshold amplifier 104 (FIG. 6), a further input of each of these amplifiers being connected to the wiper of a potentiometer 106 which provides a common threshold adjustment for these amplifiers. If desired, each amplifier can additionally have an individual threshold trimmer. The signal from a threshold amplifier has a "logic 1" value when light falls on its photoelectric device. An OR gate 108 receives signals from all the threshold amplifiers and supplies a signal with a "logic 1" value when light falls on any of the photoelectric devices. This signal passes through a mask amplifier and encoder circuit 110, the digital output of which for a scanned line of the mask is transferred into store 56. The resolution of the mask information along a scanning line may advantageously be greater than that of the picture information, especially when the mask includes lettering of small size; the circuit 110 may include packing circuits of knownkind to permit the increased signal density to be accommodated. When a line of the mask has been scanned, the exposure of the first of the separation films to pass under the exposing head is controlled by extracting the mask information from store 56 and applying it through a serialiser 112 to the buffer 76 to modify the exposure-control signals. After a further one-fifth of a rotation of the output cylinder, the mask information is again extracted from store to modify the signals for the next separation, and so on. Control circuits (not shown) are included to turn the modulator 81 fully on during the time that the mask is passing the head, to ensure that the mask is illuminated as strongly as possible. The modulator may be a Pockel cell with polarisers.

It may be advantageous in some cases to use two stores for the colour-signal information, an odd-line store and an even-line store, the stores being loaded alternately. Then during one revolution the analysing head loads the odd-line store while the even-line store is unloaded to provide information for the reproducing head, and vice versa.

In image reproduction, an objectionable moire interference is observed when a half-tone screen is used in reproduction processes following the scanning. This is so, for example, when the image contains 200 lines to the inch. The problem can be overcome by making the rotatable output scanning head rotate an integral number of times faster than the input drum, for example six times faster. Then a line of picture taken from an even line store 56 is then read out six times before it is replaced by the next line, taken from the odd-line half of store 56, and so on. Obviously, the output traverse rates and spot size are chosen so that the picture is still correctly proportioned but the picture is now constructed of 1200 lines to the inch, made up of 200 groups of six identical lines. This structure is sufficiently fine to avoid the moire problem. It is undesirable to operate the input scanner at the higher speed because the signal-to-noise ratio would decrease.

The separations produced by the apparatus described above are exposed films; however, they could take other forms, for example they could be surfaces suitable for engraving with an electron beam or for engraving with a laser.

Although in the example described the colour-component signals are derived by scanning an original wrapped around an input cylinder, it will be understood that other methods of scanning can be used to derive the colour-component signals. For example, the scanning light spot could be generated by a cathode-ray tube, the spot tracing a raster on the tube face and scanning a stationary original.

In some cases it may be desirable to store the colour component signals on a record medium before using them to expose the separations on the output cylinder.

I claim:

1. A method of reproducing an image on a light-sensitive surface by scanning the surface with a light beam modulated in accordance with an electric signal obtained by scanning an original to be reproduced and representing the density or a color-component density of successively scanned elements of the original, the method comprising the steps of:

mounting the light-sensitive recording surface on the cylindrical surface of a non-rotating cylinder;

mounting a rotatable prism having a plurality of internal reflecting surfaces, with a number of said surfaces sequentially reflecting an incident light beam, within and on the axis of said cylinder and rotating said reflector about the said axis;

directing a light beam along the axis of said cylinder so that it is internally reflected by said number of surfaces internally to said cylindrical surface to define a circular track thereon; and progressively displacing said circular track along said cylindrical surface to define a scanning raster on the said light-sensitive surface mounted on said cylindrical surface by relative movement of said cylinder and light-sensitive surface on the one hand and said prism on the other hand in a direction parallel to the axis of said cylinder.

2. A method in accordance with claim 1, comprising moving said prism along the axis of said cylinder to obtain said relative movement in a direction parallel to the axis of said cylinder.

3. A method in accordance with claim 1, in which said cylinder is transparent, the method comprising mounting said light-sensitive sheet on the external surface of said transparent cylinder with its sensitive side innermost.

4. A method in accordance with claim 1, in which said light-sensitive recording surface and a mask are mounted on a common cylindrical track of said cylindrical surface, the said beam serving both to expose said light-sensitive surface and to illuminate said mask, and during illumination of said mask scanning said mask with a photo-electric device and deriving an electric signal therefrom representing the density of successively scanned elements of said mask to control the substitution of replacement signals for parts of the said electric signal obtained by scanning the original.

5. Image-reproduction apparatus comprising:

a cylinder;

a medium having a light-sensitive recording surface on which an image is to be reproduced received on the surface of said cylinder;

a reproducing head for exposing the said light-sensitive surface, element by element, to form an image thereon, said reproducing head including means for directing a beam of light along the axis of said cylinder, a rotatable prism having a plurality of internal reflecting surfaces, with a number of said surfaces sequentially reflecting an incident light beam, mounted within said cylinder and on the axis thereof, so as to reflect the said beam to the said cylindrical surface, and means for modulating the beam intensity;

driving means for rotating said prism about the axis of the cylinder to cause the said beam to move around a circular track of the cylindrical surface;

and means for effecting relative movement between said prism and light-sensitive surface on said cylindrical surface in a direction parallel to the axis of said cylinder to cause progressive displacement of the circular track along the cylindrical surface and thus define a scanning raster on said light-sensitive surface on the cylindrical surface.

6. Apparatus in accordance with claim 5, in which said cylinder is of transparent material, whereby the light-sensitive surface can be placed around the external surface of the cylinder with its sensitive side innermost and exposed through said cylinder.

7. Apparatus in accordance with claim 5, in which said prism is a pentaprism.

8. Apparatus in accordance with claim 5, including an input cylinder and an analyzing head for deriving electric signals representing the density, or color-component density, of successively scanned elements of an original mounted on the said input cylinder, an electric motor coupled to said input cylinder to drive the latter in rotation relative to said analyzing head, and a synchro transmission unit for transmitting drive from said motor to said prism, said synchro transmission unit including a differential synchro adjustable to move the position of the image on said light-sensitive surface.

9. Apparatus in accordance with claim 5, for use when two or more light-sensitive surfaces, each destined to form a respective color separation of an original, are mounted on a single cylindrical track of said cylinder, the apparatus including:

switching means having a number of inputs and an output connected to said reproducing head;

means for applying to the inputs of said switching means respective electric signals representing density variations of each color component required for the respective color separations; and means synchronized with the rotation of said prism for controlling the operation of said switching means so that there are applied to the reproducing head, in the course of a revolution of said prism, electric signals which successively represent a line of each of the said color separations.

10. Apparatus in accordance with claim 5, for use when a mask is to be analyzed, to provide an electric signal for controlling the substitution of replacement signals for image-representing signals used to control the exposure of the light-sensitive surface on a single cylindrical track of said cylinder, said reproducing head including a beam-intensity modulating means, the apparatus further comprising:

switching means coupled to said modulating means and controlled in accordance with the rotation of said prism to render said modulating means operative to modulate the beam intensity during scanning of said light-sensitive surface and to maintain the intensity of the beam at a constant level during scanning of the mask; and a photo-electric device receiving light from the mask and providing signals representing the density of successively scanned elements of the mask.

* * * * *